United States Patent
Johnston (10) Patent No.: US 8,121,435 B2
(45) Date of Patent: Feb. 21, 2012

(54) SYSTEMS AND METHODS FOR RESOLUTION SWITCHING

(75) Inventor: Peter Johnston, San Francisco, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 996 days.

(21) Appl. No.: 12/078,415

(22) Filed: Mar. 31, 2008

(65) Prior Publication Data

US 2009/0245665 A1    Oct. 1, 2009

(51) Int. Cl.
*G06K 9/32* (2006.01)

(52) U.S. Cl. ......... 382/299; 382/235; 382/243; 382/275

(58) Field of Classification Search ............... 382/235, 382/243, 244, 252
See application file for complete search history.

(56) References Cited

U.S. PATENT DOCUMENTS

| | | | |
|---|---|---|---|
| 5,610,646 A | 3/1997 | Isaka et al. | |
| 5,680,488 A | 10/1997 | Shimooku | |
| 5,764,804 A | 6/1998 | Yajima et al. | |
| 5,841,552 A | 11/1998 | Atobe et al. | |
| 5,963,672 A | 10/1999 | Yajima et al. | |
| 6,002,794 A * | 12/1999 | Bonneau et al. | 382/166 |
| 6,041,165 A | 3/2000 | Morikawa | |
| 6,078,689 A * | 6/2000 | Kunitake et al. | 382/232 |
| 6,106,093 A | 8/2000 | Nagoshi et al. | |
| 6,342,950 B1 | 1/2002 | Tabata et al. | |
| 6,570,672 B1 | 5/2003 | Hattori | |
| 6,614,553 B2 | 9/2003 | Nakami et al. | |
| 6,694,061 B1 | 2/2004 | Acharya | |
| 6,754,394 B2 * | 6/2004 | Boliek et al. | 382/240 |
| 6,776,544 B2 | 8/2004 | Jauert | |
| 6,795,211 B1 * | 9/2004 | Eschbach et al. | 358/1.2 |
| 6,853,755 B2 * | 2/2005 | Li | 382/239 |
| 7,130,474 B2 | 10/2006 | Luo et al. | |
| 7,171,045 B1 | 1/2007 | Hamilton | |
| 7,330,273 B2 * | 2/2008 | Podoleanu et al. | 356/497 |
| 7,382,925 B2 * | 6/2008 | Boliek et al. | 382/233 |
| 7,397,575 B2 | 7/2008 | Sekiguchi | |
| 7,418,144 B2 * | 8/2008 | Wang et al. | 382/240 |
| 7,418,148 B2 | 8/2008 | Hayashi | |

(Continued)

FOREIGN PATENT DOCUMENTS

GB    2 372 898    9/2002

(Continued)

OTHER PUBLICATIONS

Office Action dated Mar. 21, 2011, in related U.S. Appl. No. 12/242,632, filed Sep. 30, 2008 (18 pgs).

*Primary Examiner* — Yosef Kassa (74) *Attorney, Agent, or Firm* — Finnegan, Henderson, Farabow, Garrett & Dunner, L.L.P.

(57) ABSTRACT

Systems and methods are provided for switching a resolution of an image, wherein the image includes at least one block. In some embodiments, the image is compressed. At least one compressed block in the compressed image is tagged, if the data size of the compressed block exceeds a threshold. A non-transition region is grown based on the at least one compressed block that is tagged until a safe-transition block is reached, wherein the non-transition region includes the at least one compressed block in the compressed image. The resolution of each compressed block in the non-transition region is reduced.

20 Claims, 5 Drawing Sheets

U.S. PATENT DOCUMENTS

| | | | |
|---|---|---|---|
| 7,439,739 B2 * | 10/2008 | Beatty | 324/309 |
| 7,440,140 B2 | 10/2008 | Lee et al. | |
| 7,474,793 B2 | 1/2009 | Weissman et al. | |
| 7,567,723 B2 * | 7/2009 | Sakakima | 382/254 |
| 7,589,853 B2 | 9/2009 | Konji et al. | |
| 7,693,328 B2 | 4/2010 | Moritani | |
| 2001/0041056 A1 | 11/2001 | Tanaka et al. | |
| 2002/0054335 A1 | 5/2002 | Sekiguchi | |
| 2004/0126019 A1 | 7/2004 | Ikebe et al. | |
| 2004/0184079 A1 | 9/2004 | Sakamoto | |
| 2005/0007609 A1 | 1/2005 | Itagaki et al. | |
| 2005/0069214 A1 | 3/2005 | Hayashi | |
| 2009/0244601 A1 | 10/2009 | Johnston | |
| 2009/0244633 A1 | 10/2009 | Johnston | |
| 2009/0245629 A1 | 10/2009 | Hayami et al. | |
| 2009/0245630 A1 | 10/2009 | Johnston | |
| 2009/0324109 A1 | 12/2009 | Johnston | |

FOREIGN PATENT DOCUMENTS

| | | |
|---|---|---|
| JP | 2003-125202 | 4/2003 |

* cited by examiner

SYSTEMS AND METHODS FOR RESOLUTION SWITCHING

TECHNICAL FIELD

This disclosure relates to resolution switching for printing systems and in particular, to systems and methods for resolution switching on laser printers.

DESCRIPTION OF RELATED ART

A typical printing system may include a print engine that controls various mechanical and electrical parts configured to print data on a page at a predetermined print speed. The print engine is usually controlled by a print controller, which communicates with a print data input device (e.g., a personal computer) and the print engine, to coordinate timing and other parameters related to the printing process. The print controller may receive image data for printing from the input device at an appropriate rate via a data transferring interface, can generate rasterized images, and send them to the print engine for printing.

Some printing systems, such as laser printing systems, may have hard real time requirements so that once a print job has been initiated, data must be transferred to the print engine at a set speed without interruption. However, the bandwidth of the data transferring interface sometimes may not be sufficient to sustain the print speed. For instance, a page containing high resolution images may have a large data size even after image compression. When such a page is being transferred to the print controller from a print data input device at the print speed, the image data may exceed the bandwidth for some time period. As a result, the page for printing may not be completely transmitted to the print controller and print engine before the physical printing starts resulting in a data underrun. Consequently, the page may not be printed properly. The performance of the printing system may therefore be significantly compromised.

Conventionally, the printer controller may include a page buffer capable of buffering an entire page before printing commences. This may allow for some flexibility in how the print data is transferred to the print controller from the print data input device. For example, in order to store a full page of print data including high resolution images the print controller may use a large amount of additional memory for both code and data storage. This may add substantial cost to the printing system. In addition, memory cannot typically be added by users to many existing printers, so an approach using additional memory will not help printers already on the market. Therefore, there is a need for systems and methods that provide a reliable printing solution that can be implemented for existing printers and that obviates the need for additional memory in the print engine.

SUMMARY

In accordance with the present invention, systems and methods are provided for switching a resolution of an image, wherein the image includes at least one block. In some embodiments, the image is compressed. At least one compressed block in the compressed image is tagged, if the data size of the compressed block exceeds a threshold. A non-transition region is grown based on the at least one compressed block that is tagged until a safe-transition block is reached, wherein the non-transition region includes the at least one compressed block in the compressed image. The resolution of each compressed block in the non-transition region is reduced.

Embodiments of the present invention also relate to software, firmware, and program instructions created, stored, accessed, or modified by processors using computer-readable media or computer-readable memory. The methods described may be performed on a computer and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
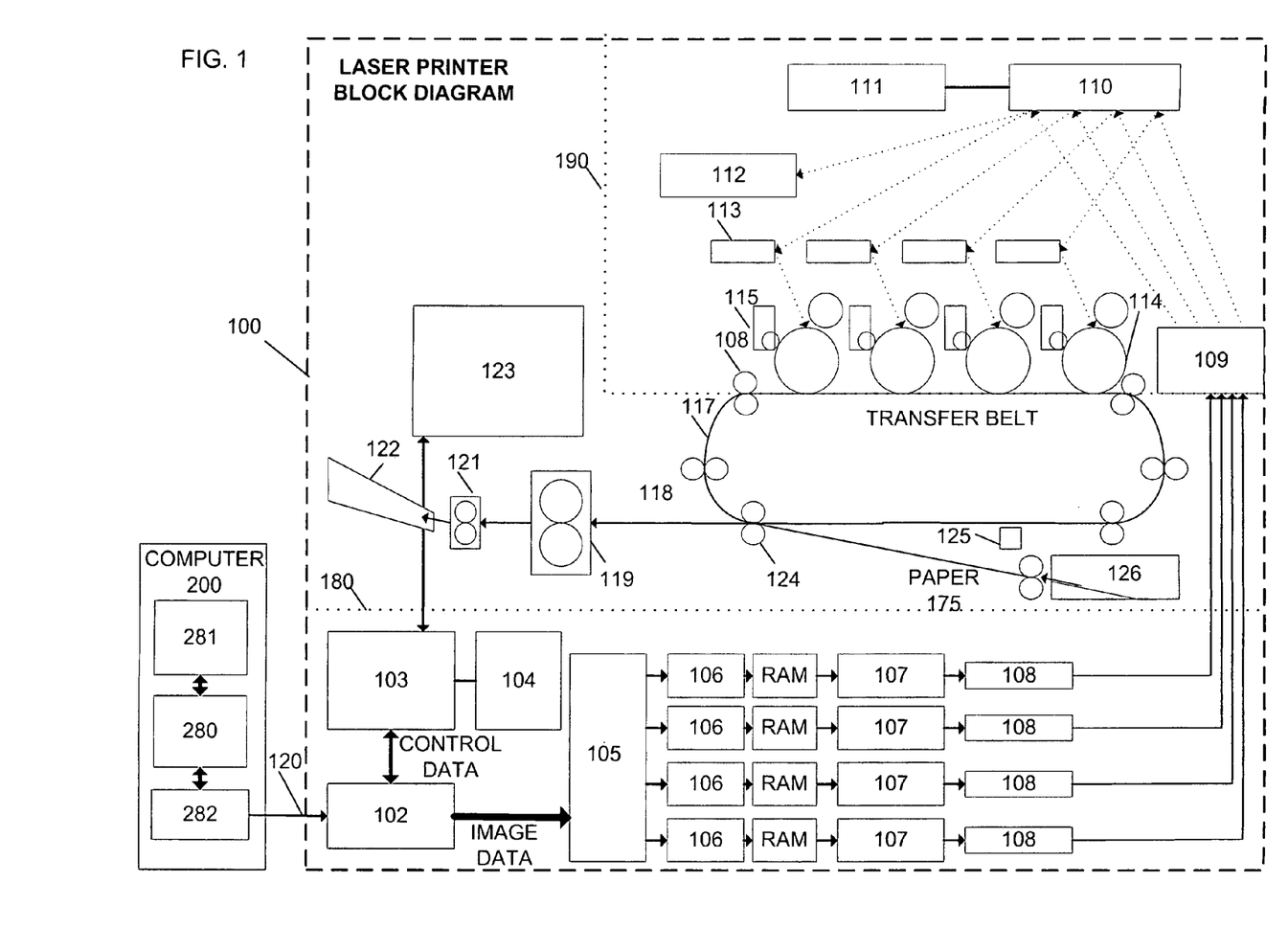
FIG. 1 shows a block diagram of an exemplary printer.

FIG. 1 is a block diagram of exemplary printer 100, which is coupled to exemplary computer 200. In some embodiments, printer 100 may be a laser printer, an LED printer, or any other printer consistent with principles of the present invention. Connection 120 couples computer 200 and printer 100 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, FIREWIRE and/or serial or parallel ports for transmission of data through appropriate connection 120. The communication links could be wireless links or wired links or any combination consistent with embodiments of the present invention that allows communication between computing device 200, and printer 100.

In some embodiments, connection 120 may operate at a predetermined data transferring frequency, or may otherwise have limited bandwidth. For example, connection 120 may operate at a determined frequency of 480 MHz and the corresponding maximum raw bandwidth may be 60 M bytes per second. In some embodiments, the maximum transfer rate of raw data may be lower than the maximum raw bandwidth due to encoding and protocol overhead. Under some exemplary protocols, an isochronous mode of transfer may be supported so that a certain amount of bandwidth may be reserved and data delivery at a corresponding transfer rate may be guaranteed. When the guaranteed transfer rate is lower than the rate at which the print engine consumes image data (i.e., print speed), data under-runs may occur on printer 100.

In one exemplary embodiment, a USB interface 102 may be used as an interface to receive data via a serial pipe. It is contemplated that other interfaces may be used to receive data via other types of connection 120, such as, for example, FIREWIRE or wireless. Data received by USB interface 102 may be routed internally along internal data paths or data and control signal paths, such as a data bus, to various internal functional modules of printer 100 as determined by control logic in printer 100. In some embodiments, data transmitted to printer 100 by computer 200 may also include destination addresses and/or commands to facilitate routing.

In some embodiments, CPU 103, memory 104, control block 105, de-compressor module 106 with attached RAM, PWM logic module 107, and driver circuit 108 may be coupled using the data bus. Data received by USB interface 102 may be placed in memory 104 under the control of the CPU 103 according to some embodiments of the present invention. De-compressor 106 and attached RAM may also be coupled to PWM logic module 107. In some embodiments, de-compressor module 106 may receive compressed image data, decompress the received image data, store the decompressed data in RAM, and send the data to PWM logic module 107.

Various data and control signal paths may couple PWM logic module 107, driver circuit 108, printhead 109, mechanical controller 123, beam detect sensor 112 and transfer belt position sensor 125. In some embodiments, printhead 109 may be a laser printhead. In some embodiments, beam detect sensor 112 may generate a start of scan (SOS) or "hsync" signal for each scan line in an image, or for a set of scan lines in an image, and send the generated signal to mechanical controller 123, which then sends signal to PWM logic module 107.

Driver circuit 108 may be communicatively coupled to PWM logic module 107 and printhead 109. In some embodiments, scanning mirror 110 may be mechanically or electromagnetically coupled to scanning motor 111, which may be used to rotate scanning mirror 110. Each laser beam from printhead 109 may be transmitted to scanning mirror 110 and scanning mirror 110 may reflect that beam, at different times, to beam detect sensor 112 and optical system 113, which may includes a cylindrical lens, an f-theta lens, a guide lens, and so on. Optical system 113 may guide laser beams from scanning mirror 110 to photosensitive drum 114. Drum charger 116 may be used to charge photosensitive drum 114. Although only one set of scanning mirror 110, scanning motor 111, and beam detect sensor 112 is illustrated in this figure, four set of the scanning mirror 110, scanning motor 111, and beam detect sensor 112 may respectively be provided for the laser beams. In this case, each beam detect sensor 112 generates SOS signal.

In some embodiments, latent images from photosensitive drum 114 may be developed with a toner at developing station 115 before transferring to paper 175. Paper 175 may be passed from paper input tray 126 through transfer rollers 124 to transfer belt 117 where toner images developed at developing tation 115 and accumulated on transfer belt 117, may be transferred to paper 175. After the image has been transferred, paper 175 may be moved over paper path 118 using transfer rollers 124 and past fuser 119, guide rollers 121, and to paper output tray 122. In some embodiments, fuser 119 may facilitate the fixing of the transferred image to paper 175.

In an exemplary embodiment, printer 100 may include a printer controller 180 and a printer engine 190. Printer controller 180 may be configured to process image data received from computer 200 via connection 120, and send the processed data to print engine 190 for printing. Printer controller 180 of printer 100 may include, among other things, a USB interface 102, a CPU 103, a memory 104, a control block 105, at least one de-compressor module 106 with attached random access memory ("RAM"), at least one pulse width modulation ("PWM") logic module 107, and at least one driver circuit 108. Exemplary printer engine 190 of printer 100 may include beam detect sensor 112, optical system 113, developing station 115, photosensitive drum 114, drum charger 116, scanning mirror 110, scanning motor 111, and printhead 109. The various modules and subsystems described above may be implemented by hardware, software, or firmware or by various combinations thereof.

In some embodiments, computer 200 may send image data to printer controller 180 over connection 120. The image data sent from the computer 200 may be compressed. In some embodiments, the compressed image data may be in a line-sequential compressed format. After image data is received by USB interface 102, the image data may be placed in memory 104 under the control of CPU 103. In some embodiments, when image data for a complete page has been stored in memory 104, a print sequence may be initiated. In some embodiments, mechanical controller 123 may initiate operations of scanning motor 110, photosensitive drum 114, and transfer belt 117 through appropriate data and/or control signals.

Beam detect sensor 112 can detect a laser beam's position and generate pulses (SOS signals) that are sent to printer controller 180 so that image data can be properly aligned from line to line in a printed image. In some embodiments, at the beginning of a scan of each line of the image, light from the printhead 109 may be reflected by scanning mirror 110 onto beam detect sensor 112. Beam detect sensor 112 may signal mechanical controller 123 which, in turn, may send a SOS signal to PWM logic module 107. In some embodiments, a separate signal typically referred to as top of data (TOD) or "vsync" may also be generated by mechanical controller 123, based on information received from transfer belt position sensor 125. The TOD or vsync signal indicates when image data transfer can begin for paper 175. For example, in some embodiments, a TOD signal may be sent to PWM logic module 107 via mechanical controller 123. Once the TOD signal is received, CPU 103 may initiate a transfer from memory 104 to de-compressor module 106. In some embodiments, de-compressor module 106 may decompress image data and pass the resulting raw image data to PWM logic module 107. The resultant PWM pulses from PWM logic module 107 may then be streamed to driver circuit 108, which may then transmit the PWM pulses to printhead 109.

In some embodiments, laser beam from printhead 109 may be modulated and reflected off scanning mirror 110 and optical system 113, causing a latent image of charged and discharged areas to be built up on photosensitive drum 114. In some embodiments, toner develops this latent image at the developing station 115 and the toner image may be transferred to transfer belt 117. For a multi-component image, such as a color image, the latent image building process may repeat for each of the components. For example, for CMYK color printers, which use cyan ("C"), magenta ("M"), yellow ("Y"), and black ("K"), the latent image building process on photosensitive drum 114 may be repeated for each of the colors C, M, Y, and K. Toner images for all four colors may be accumulated on transfer belt 117 before a complete toner image is transferred to the page at transfer roller 124.

In some embodiments, when all components have been assembled on transfer belt 117, paper 175 may be fed from paper input tray 126 to transfer roller 124 where the image may be further transferred to paper 175. Fuser 119 may then fix the toner to paper 175, which is sent to paper output tray 122 using guide rollers 121. In some embodiments, the rate that the images are transferred to paper 175 (i.e., the print speed) may be determined by the rotational speed of transfer belt 117. For example, once the rotational speed is set for the transfer belt 117, the print speed may become constant and any delay in image data transfer to print engine 190 may cause video under-runs and the page may not be printed properly.

A pixel clock generation module (not shown) may be a crystal oscillator or a programmable clock oscillator, or any other appropriate clock generating device. In some embodiments, such as in a "multi-pass" printer 100, which sends the video data for each color serially in sequence, the frequency of the clock generated by the pixel clock generation module may be fixed among each pass of the printer. In an example multi-pass printer 100, the pixel clock generation module may be a crystal oscillator. In another embodiment, such as a printer 100 that uses multiple sets of printer engine 190, sometimes collectively referred to as a "tandem engine", the frequency of each channel may be calibrated if the frequencies differ among the pixel clocks corresponding to each of the color components. In such embodiments, one or more programmable clock oscillators may be used to allow calibration.

Exemplary embodiments of printer 100 may include driver circuit 108 driving multiple sets of printer engine 190, which may be connected to multiple printheads 109. In some embodiments, printheads 109 could all be laser printheads. There may also be a plurality of individual modules of printer controller 180. For example, a single de-compressor module 106 may be connected to multiple PWM logic modules 107 with each PWM module 107 being connected to one or more pixel clock generation modules and one or more driver circuits 108. De-compressor module 106 and attached RAM could provide each PWM logic module 107 with one or more color components of an image, which would then be sent to the multiple driver circuits 108 for onward transmission to one or more sets of printer engine 190.

In other embodiments, multiple de-compressor module 106 may be coupled to multiple PWM logic modules 107. Each de-compressor module 106 may provide a PWM logic module 107 with a decompressed component of the image. For example, for a multi-component image in CMYK color space, which contains cyan ("C"), magenta ("M"), yellow ("Y"), and black ("K") image components, each individual image component may be processed by each de-compressor module 106 and sent down to each corresponding PWM logic module 107 in a parallel manner.

In some embodiments, printer 100 may have multiple lasers per laser printhead 109. In some embodiments, printhead 109 may receive multiple lines of data from driver circuit 108 and project the multiple lines of data to scanning mirror 110. Scanning mirror 110 may then reflect the multiple lines of data to beam detect sensor 112 and optical system 113, which may reflect the multiple lines to photosensitive drum 114. In some embodiments, the beam detect sensor 112 may detect a signal, such as a laser signal, reflected off of the scanning mirror 110, or may also detect multiple signals reflected off scanning mirror 110.

Each of the logical or functional modules described above for printer 100 may comprise multiple modules. The modules may be implemented individually or their functions may be combined with the functions of other modules. Further, each of the modules may be implemented on individual components, or the modules may be implemented as a combination of components.

Exemplary computer 200 may be a computer workstation, desktop computer, laptop computer, or any other computing device capable of being used with printer 100. In some embodiments, exemplary computer 200 may include, among other things, a processor 280, a memory 281, and a USB interface 282. Processor 280 may be a central processing unit ("CPU"). Depending on the type of computer 200 being used, processor 280 may include one or more printed circuit boards, and/or a microprocessor chip. Processor 280 may execute sequences of computer program instructions to perform various processes that will be explained later. The computer program instructions may be accessed and read from memory 281, or any other suitable memory location, and be executed by processor 240. Memory 281 may be any type of Dynamic Random Access Memory ("DRAM") such as, but not limited to, SDRAM, or RDRAM.

In one exemplary embodiment, a USB interface 282 may be included in computer 200 as an interface to send and receive data via a serial pipe. For example, USB interface 282 may be coupled to processor 280 to receive data to be printed and send the data to printer 100 via connection 120. It is contemplated that other interfaces may also be used to send data via other types of connection 120, such as, for example, parallel port, FIREWIRE or wireless interfaces.

In order to avoid data under-runs on printer 100, a full page image data should be transferred from computer 200 to printer 100 at a speed higher than or at least equal to the print speed of printer 100. A resolution switching application may be included on computer 200 to reduce the size of the image data when needed, so that the image data may be fit into the bandwidth of connection 120. In some embodiments, the resolution switching application may run on computer 200. It is also contemplated that the resolution switching application may be stored on a removable computer readable medium, such as a hard drive, computer disk, CD-ROM, DVD ROM, CD±RW or DVD±RW, USB flash drive, memory stick, or any other suitable medium.

Figure 2:
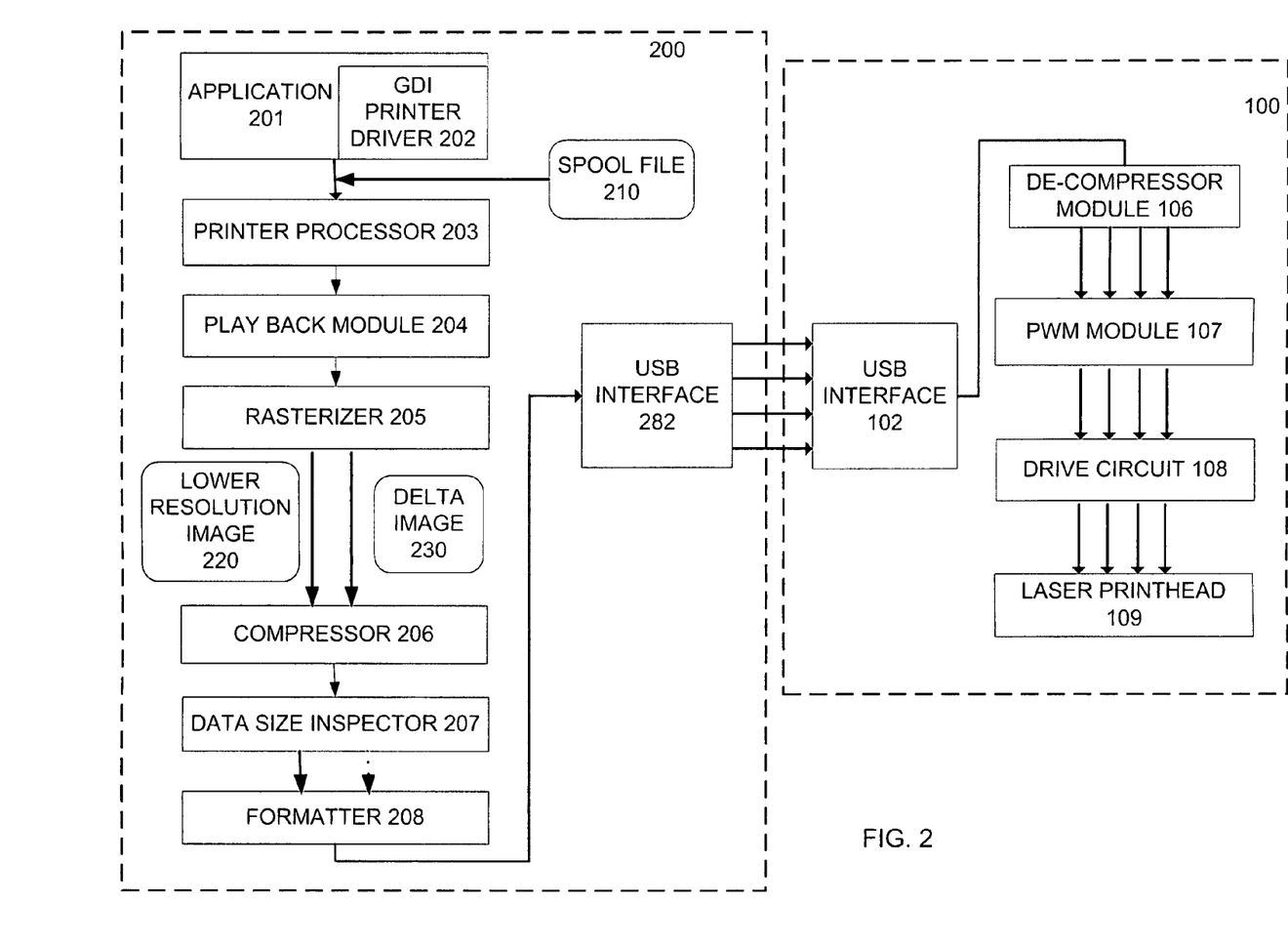
FIG. 2 shows a block diagram indicating an exemplary data flow between an exemplary computer and an exemplary printer for resolution switching.

FIG. 2 shows a block diagram indicating an exemplary data flow between an exemplary computer and an exemplary printer for resolution switching, according to disclosed embodiments. In an exemplary embodiment, a print job may be initiated by an application 201 running on computer 200. For example, application 210 may use a graphic device interface ("GDI") and printer driver 202 to generate a description of the print job. The description may include the image data to be printed, such as a letter or a picture, and formatting and printing instructions that form the image data into a properly printed page. In some embodiments, application 201 may use GDI and printer driver 202 to format the description in the form of meta data and generate a print spool file 210.

The size of the image data may vary depending on the number of color planes associated with the data and the resolution of the image. In some embodiments, the image data may include multiple components associated with multiple color planes. For example, the image may be in a CMYK color space and may contain cyan ("C"), magenta ("M"), yellow ("Y"), and black ("K") image components. Each image component may be processed and/or transferred one after another, or in a parallel manner. In some embodiments, the formatting and printing instructions may be created and stored as a header file of print spool file 210. The size of the header file may be relatively constant among various print jobs.

In some embodiments, the generated print spool file 210 may be sent to a printer processor 203 on computer 200. Printer processor 203 may perform tasks such as collating on print spool file 210 before it is sent off to a playback module 204 for playback. In some embodiments, playback module 204 may create a list of simple objects that can be rasterized by rasterizer 205, based on the GDI description of in print spool file 210.

Print spool file 210 may then be sent to a rasterizer 205. Rasterizer 205 may be configured to transform the image data in print spool file 210 into bitmap data. Rasterizer 205 may further include a frame buffer that contains information related to how pixels will be printed by printer 100 on a print medium. Rasterized bitmap data may be stored in a frame buffer. In some embodiments, rasterizer 205 may transform the image data block by block, when the size of the image data is relatively large. In some embodiments, computer 200 may include a plurality of rasterizers configured to rasterize color data into a plurality of bitmaps. For example, computer 200 may include four rasterizers for rasterizing the C, M, Y, K image components in a parallel manner.

Consistent with one embodiment of the present disclosure, rasterizer 205 may be further configured to compute a lower resolution image 220 and a delta image 230 for the image data. For example, the original image data in print spool file 201 may have a resolution of 600 dpi. Rasterizer 205 may compute lower resolution image 220 that have a resolution of 480 dpi and delta image 230 that represents the difference information between the original image and the lower resolution image. In some embodiments, delta image 230 may include a portion of the original high resolution image data. In some embodiments, delta image 230 can be used recover the original higher resolution image when used in conjunction with the lower resolution image 220 of the original image. The computation used to compute delta image 230 may be mathematically reversed to reconstruct the original image from lower resolution image 220 and delta image 230.

In some embodiments, resolution may be reduced in only one physical dimension. For example, resolution may be reduced only in the main scanning direction (i.e., perpendicular to the direction in which paper is fed to a printer) so that the image data transfer rate keeps up with print speed. For example, if paper is fed to the printer along its length (i.e. vertically) then resolution may be reduced in the horizontal direction. In some embodiments, resolution may be reduced in both dimensions (horizontal and vertical). Various algorithms may be used to compute lower resolution image 220 and delta image 230.

Both lower resolution image 220 and delta image 230 may be compressed by compressor 206. Compression may reduce the size of the image data, and therefore reduce the amount of bandwidth needed at connection 120 for transferring the image data. In some embodiments, compressor 206 may use lossless compression methods such as, for example, JBIG and GIF compressions, so that the image may be perfectly reconstructed by decompression at de-compressor module 106. When lossless compression is used, the image quality may be preserved through the compression and decompression process. However, a high compression ratio cannot always be guaranteed for lossless compressions. For example, images containing high resolution details may not always compress well, i.e., the size of the compressed image may sometimes be comparable to the size of the original image before compression. In some other embodiments, compressor 206 may use lossy compression methods such as, for example, JPEG and wavelet compressions. Using lossy compression may yield higher compression ratios on average than lossless compression but exact reconstruction of the original image from the compressed data may not always be achieved. Compressor 206 may also be configured to use a combination of lossless compression and lossy compression to balance between image quality and compression ratio.

Compressed lower resolution image 220 and delta image 230 may be passed from compressor 206 to a data size inspector 207. Data size inspector 207 may be configured to determine if both images can be sent across connection 120 without exceeding the bandwidth of connection 120. In some embodiments, data size inspector 207 may make its determination on a block by block basis, depending on the size of the buffers in printer controller 180 and/or on the granularity of the resolution switching scheme. For example, for the smallest granularity, the determination may be made on a line by line basis.

In some embodiments, data size inspector 207 may inspect a block of the original image data and determine the total data size of those portions of compressed lower resolution image 220 and compressed delta image 230 that correspond to the block. Data size inspector 207 may then compare the total data size with some threshold. According to one embodiment, the threshold may be determined based on the print speed of printer 100 and the bandwidth of connection 120. Data size inspector 206 may tag a block if it has a data size that is larger than the threshold.

Compressed lower resolution image 220 and compressed delta image 230 may be further passed from data size inspector 207 to a formatter 208. Formatter 208 may be configured to accumulate one full image in memory before passing it to USB interface 282 and transferring to printer 100. Consistent with one embodiment of the present disclosure, formatter 208 may be further configured to examine if a block image received from data size inspector 207 is tagged. If a block is tagged, formatter 208 may remove the portion of delta image 230 that is associated with the tagged block.

To avoid unsightly resolution transitions in the middle of highly detailed images, such as photographs, in some embodiments, formatter 208 may be further configured to grow a non-transition region from a block that is tagged until a "safe-transition" block is reached. The non-transition region may be a region not suitable for resolution transitions. For example, the non-transition region may include high resolution details of the image, or may be data intensive portion of the image. In some embodiments, the resolution of each block in the non-transition region is reduced. A safe-transition block may contain relatively low-resolution image information such that reducing the image resolution may not affect the visual quality of the image and thus, a resolution transition may not be noticeable by human eyes. For example, a region where there is only white space (blank space) or solid colors may be suitable for resolution transition.

The non-transition region may include at least one image block. For example, the block that is tagged may be included, and along with some set of contiguous blocks. In some embodiments, formatter 208 may be configured to grow the non-transition region by including blocks adjacent to one edge of the region, if this adjacent block is not a safe-transition block. Once safe-transition blocks are reached on both ends of the region, formatter 208 may stop growing the region and remove the portion of delta image 230 that are associated with the entire non-transition region.

For a block that is neither tagged nor included in a region grown from a tagged block, formatter 208 may reconstruct the block based on the corresponding portions of the compressed lower resolution image 220 and the compressed delta image 230. Formatter 208 may then buffer one full image in the memory, where the buffered image includes blocks of reduced resolution and blocks of original resolution. Formatter 208 may provide the accumulated full image to USB interface 282.

USB interface 282 of computer 200 may transfer buffered image data in a compressed form to USB interface 102 of printer 100 via connection 120. In some embodiments, the image data may include multiple components associated with multiple color planes. For example, the image may contain cyan ("C"), magenta ("M"), yellow ("Y"), and black ("K") image components. Each image component may be transferred sequentially, or in a parallel manner as shown in FIG. 2. In some embodiments, an isochronous mode of transfer may be supported so that a certain amount of bandwidth may be reserved for each C/M/Y/K image component, and data delivery at a corresponding transfer rate may be guaranteed.

In some embodiments, the compressed image data may be decompressed by de-compressor module 106 using de-compression algorithms corresponding to the compression algorithms used by compressor 206. For example, if JBIG compression is used by compressor 206, the JBIG decompression may be used by de-compressor module 106. When a lossy compression is used by compressor 206, de-compression may not exactly reconstruct the image data as in print spool file 210.

In some embodiments, de-compressor module 106 may pass the decompressed image data to PWM logic module 107. The resultant PWM pulses from PWM logic module 107 may then be streamed to driver circuit 108, which may then transmit the PWM pulses to printhead 109. In some embodiments, images may be decompressed block-by-block. Consistent with an embodiment disclosed later in this disclosure, each block of the decompressed image data may have a different resolution. For example, a block may have a resolution of 480 dpi, and another block may have a resolution of 600 dpi, as shown in the exemplary embodiment below). In some embodiments, PWM logic module 107, therefore, may be construed to be able to dynamically switch itself in either of high resolution mode (for 600-dpi-driving) or a low resolution mode (for 480-dpi-driving) block-by-block basis. Any conventional method or mechanism may be deployed for switching of the operation mode of PWM logic module.

Figure 3:
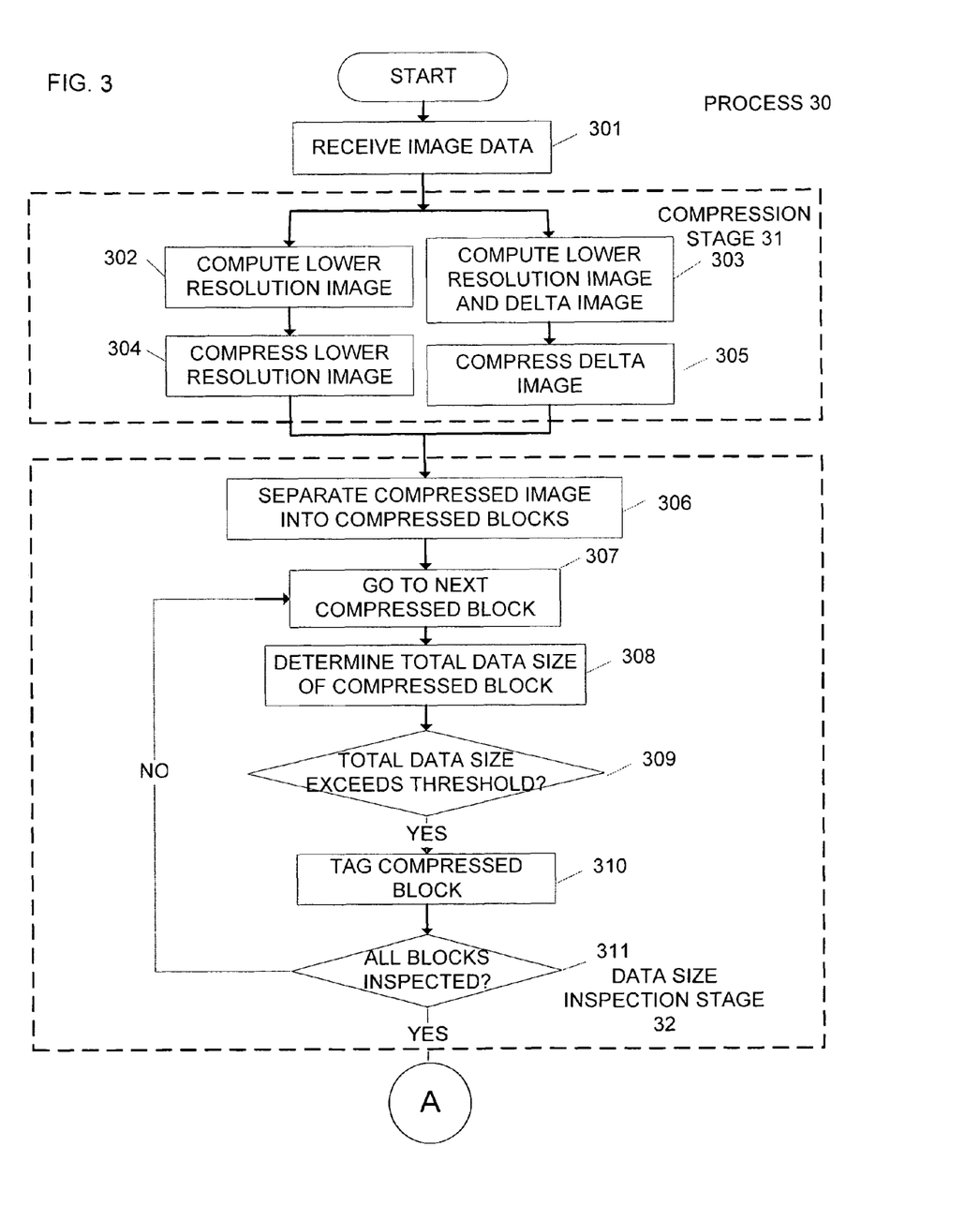
FIG. 3 is a flow chart of an exemplary resolution switching operation process.

FIG. 3 shows a flow chart of an exemplary resolution switching operation process according to the disclosed embodiments. The algorithm described in FIG. 3 may also be applied to various other types of printing systems such as, for example, copiers and multi-function devices, with appropriate modifications specific to the device and in a manner consistent with embodiments disclosed herein. The algorithm described in FIG. 3 may further be used in conjunction with various software applications to perform resolution switching.

In step 301, image data may be received. For example, application 201 may generate a print spool file 210 that contains print image data and printing instructions and print spool file 210 may be received by printer processor 203 from application 201. In some embodiments, the image data may include multiple components associated with multiple color planes.

A compression stage 31 of process 30 may begin after step 301. Based on the image data, a lower resolution image may be computed in step 302 and a corresponding delta image may be computed in step 303. For example, rasterizer 205 may compute lower resolution image 220 and delta image 230 for the image data in print spool file 210. For example, a lower resolution image with a resolution of 480 dpi may be computed from an original image with a resolution of 600 dpi. A corresponding delta image may also be computed simultaneously. Delta image 230 represents difference information between the original image and the lower resolution image. The computation of delta image 230 may be mathematically reversed to reconstruct the original image from the lower resolution image and the delta image.

After the lower resolution image 220 and delta image 230 are computed in step 302 and 303, both images may be compressed in step 304 and step 305. For example, the images may be compressed by compressor 206. Compression may further reduce the size of the images. For example, compressor 206 may use lossless compression methods, so that the image may be perfectly reconstructed by decompression. In some embodiments, images containing high resolution details may not be compressed sufficiently and thus, the data size of the images may not be significantly reduced after compressions.

In some embodiments, data size inspection stage 32 may begin after the images are compressed. In data size inspection stage 32, it may be determined if both images can be sent across connection 120 without exceeding the bandwidth of connection 120. In some embodiments, the determination may be made on a block by block basis. For example, in step 306, the image may be separated into blocks. For the smallest granularity, the blocks may be individual lines of the image.

In step 307, the first or the next block may be inspected. In some embodiments, in step 308, the total data size of the portions of the compressed lower resolution image and delta image that correspond to the block may be determined. For example, the determination may be made on a line by line basis, and the total pixel number of each line of the compressed lower resolution image and each line of the compressed delta image may be determined by data size inspector 207. In step 309, the total data size may be compared with some pre-determined threshold. According to one embodiment, the threshold may be determined based on the print speed of printer 100 and the bandwidth of connection 120.

In step 309, if the total data size exceeds the threshold, the block may be tagged with a delta removal flag in step 310. In some embodiments, the delta removal flag may indicate that a portion of the delta image corresponding to the current block should be removed. In step 311, it may be determined whether all the blocks have been inspected. If there is still at least one block of the image left uninspected, the algorithm may go back to step 307 and inspect the next block. The algorithm can iterate through steps 306-311 until all the blocks have been inspected. For example, data size inspector 207 may go through each block in the image.

A formatting stage 33 may begin after all the blocks in the image are inspected and properly tagged. For example, formatting stage 33 may accumulate a full image before the image is sent to a printing device. In some embodiments, formatting may also be done on a block by block basis. In step 312, the first or next block may be accessed. In step 313, it may be determined if a delta removal flag is associated with the current block.

In step 313, if the delta removal flag is on, it may be further determined if the current block is a safe transition block in step 314. In some embodiments, a safe-transition block may contain relatively low-resolution image information such that reducing the image resolution may not affect the visual quality of the image and thus, a resolution transition may not be noticeable by human eyes. For example, a region where there is only white space (blank space) or solid colors may be suitable for resolution transition.

Various image processing methods may be used to determine whether the current block is a safe transition block. For example, a spectrum analysis may be performed on the block image and the block may be determined as a safe transition block if the spectrum has negligible high frequency components. According to one embodiment, a block that can be sufficiently compressed may be determined as a safe transition block. For example, if the portion of the lower resolution image corresponding to the current block may be sufficiently compressed in step 304, the current block may be a safe transition block.

If the current block is determined not to be a safe transition block (step 314: No), the portion of delta image corresponding to the current block may be removed in step 315. In step 314, if the current block is determined as a safe transition block, the delta removal flag may be turned off in step 316. In step 317, it may be determined if the current block is tagged during data size inspection stage 32. In some embodiments, if the current block is tagged, the algorithm may backtrack to the start block of a non-transition region and remove all corresponding delta image blocks in step 318. In some embodiments, the non-transition region may be grown backwards from the current tagged block until a safe-transition block is reached. For example, the non-transition region may include at least one block of the image including the block that is tagged, and some previous blocks. In some embodiments, the non-transition region may be grown by including into the non-transition region a block adjacent to the growing edge of the region, if the block is not a safe-transition block. Once a safe-transition block is reached, the region growing may be stopped and the portion of the delta image that are associated with the entire grown region may be removed. Accordingly, in step 319, the delta removal flag may be turned on.

In step 319, if the current block is not tagged, the current block can fit into the bandwidth without any problem so that no resolution reduction may be needed. Accordingly, in step 320, the current block may be reconstructed based on the corresponding portions of the lower resolution image and the delta image.

After step 315, step 319 or step 320, it may be determined whether all the blocks have been formatted in step 321. If there is still at least one block of the image left unformatted, the algorithm may go back to step 312 and format the next block. The algorithm can iterate through steps 312-321 until all the blocks have been formatted, after which exemplary process 30 may terminate.

Various algorithms may be used to compute the lower resolution image and the delta image in step 302 and 303. For example, the lower resolution image may be obtained by pixel averaging of the original image, and the delta image may be obtained as the difference image between the original image and the lower resolution image. For another example, the lower resolution image may be obtained by applying a low-pass filer to the original image, and the delta image may be obtained by applying a high-pass filter to the original image. In some embodiments, the lower resolution image may have a resolution lower than the original image in only one-dimension, such as the main scanning direction.

Figure 4:
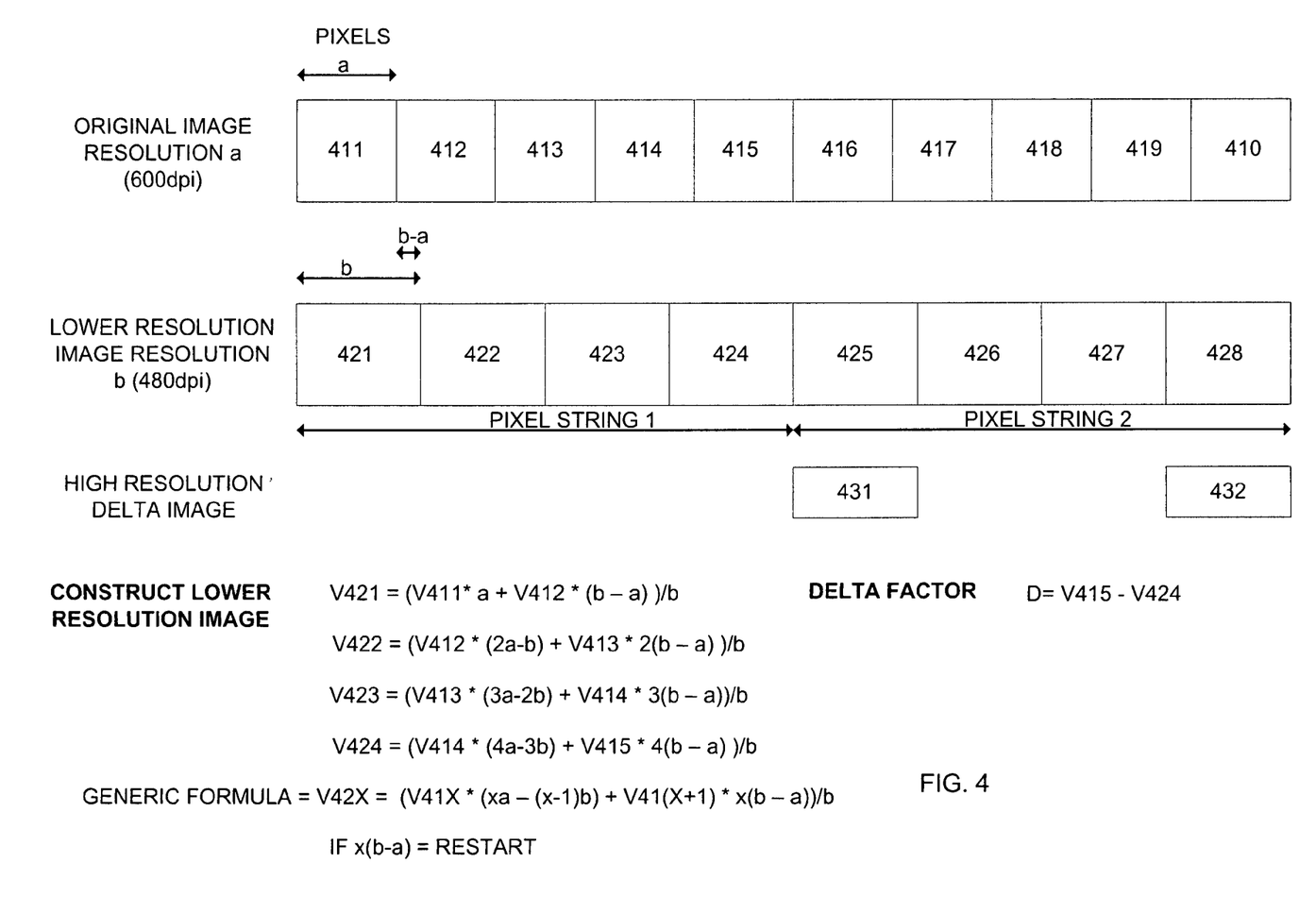
FIG. 4 shows an illustration of an algorithm for computing a lower resolution image and a delta image based on a higher resolution image.

FIG. 4 shows an illustration of an exemplary algorithm for computing a lower resolution image and a delta image based on a higher resolution image. As shown in FIG. 4, for example, a lower resolution image of a resolution b=480 dpi in one dimension may be computed based on the original image of a resolution a=600 dpi in that dimension. An exemplary line of the original image may include pixels 411-410, and an exemplary line of the lower resolution image may include pixels 421-428. For the example illustrated in FIG. 4, the total dimensional size of five pixels (e.g., pixels 411-415) in the original image may be the same as the total dimensional size of four pixels (e.g., pixels 421-424) in the lower resolution image. As a result, if the original image has a total pixel number (data size) of N, the lower resolution image may have a total pixel number of only 0.8N. Accordingly, a delta image having a total pixel number of 0.2N may be computed, and the original image may be reconstructed from the lower resolution image and the delta image.

In some embodiments, the pixel values of the lower resolution image and the delta image are computed based on pixel values of the original image, the resolution of the original image, and a desired resolution of the lower resolution image. For example, the pixel value of pixel 421, denoted by $V_{421}$, may be determined using $V_{421}=(V_{411}*a+V_{412}*(b-a))/b$, where $V_{411}$ denotes the pixel value of pixel 411 and $V_{412}$ denotes the pixel value of pixel 412. Similarly, other pixel values $V_{422}$-$V_{423}$ corresponding to pixels 422-423, respectively, in pixel string 1 may be determined in accordance with the following equations:

$$V_{422}=(V_{412}*(2a-b)+V_{413}*2(b-a))/b$$

$$V_{423}=(V_{413}*(3a-2b)+V_{414}*3(b-a))/b$$

$$V_{424}=(V_{414}*(4a-3b)+V_{415}*4(b-a))/b$$

In general, a pixel value $V_{42x}$ of pixel 42x may be determined as $V_{42x}=(V_{41x}*(xa-(x-1)b)+V_{41(x+1)}*x(b-a))/b$, where x represents any integer. In some embodiments, a delta factor may be determined for each pixel string. For example, a delta factor D for pixel 431 may be determined using $D=V_{415}-V_{424}$. The original image may be reconstructed exactly from the computed lower resolution image and delta image.

In some embodiments, the aforementioned compressed block data may be formatted and sent to printer 100, where each block may be decompressed to restore bitmap data of the block. Depending on whether the delta image is removed during the formatting process, the block may be restored in either a low resolution (e.g., 480 dpi) or high resolution (e.g., 600 dpi). In some embodiments, based on the resolutions of the bitmap data of the blocks, operation mode of each PWM logic 107 may be dynamically switched between low resolution mode and high resolution mode to reproduce the image on the paper 175 properly.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A method for switching a resolution of at least one image, wherein the image comprises at least one block, the method comprising:
    compressing the image;
    tagging at least one compressed block in the compressed image, if the data size of the compressed block exceeds a threshold;
    growing a non-transition region based on the at least one compressed block that is tagged until a safe-transition block is reached, wherein the non-transition region includes the at least one compressed block in the compressed image; and
    reducing the resolution of each compressed block in the non-transition region.

2. The method of claim 1, wherein the threshold is determined based in part on a bandwidth of a communication interface that transfers the compressed image.

3. The method of claim 2, wherein the threshold is determined further based on a print speed of a printer to which the compressed image is transferred.

4. The method of claim 1, wherein compressing the image comprises compressing a lower resolution image and a delta image derived from the image.

5. The method of claim 4, wherein the data size of a compressed block in the compressed image is the sum of: a data size of a portion of the compressed lower resolution image corresponding to the compressed block; and a data size of a portion of the compressed delta image corresponding to the compressed block.

6. The method of claim 1, wherein reducing the resolution of each compressed block comprises removing a delta image corresponding to the compressed block.

7. The method of claim 4, wherein the resolution of the lower resolution image is lowered along one dimension.

8. The method of claim 7, wherein the lower resolution image and the delta image are computed based on one or more of: pixel values of the image; an original resolution of the image; and a desired resolution of the lower resolution image.

9. The method of claim 1, wherein growing the non-transition region based on the at least one compressed block comprises including into the non-transition region a block adjacent to one edge of the region, if the block is not a safe-transition block.

10. The method of claim 1, wherein the safe-transition block has a resolution lower than an original resolution of the image.

11. The method of claim 2, wherein the communication interface is selected from the group consisting of: USB; Ethernet and Firewire.

12. A non-transitory computer-readable medium that contains instructions which, when executed by a processor, performs steps in a method for switching a resolution of at least one image, wherein the image comprises at least one block, the method comprising:
compressing the image;
tagging at least one compressed block in the compressed image, if the data size of the compressed block exceeds a threshold;
growing a non-transition region based on the at least one compressed block that is tagged until a safe-transition block is reached, wherein the non-transition region includes the at least one compressed block in the compressed image; and
reducing the resolution of each compressed block in the non-transition region.

13. The non-transitory computer-readable medium of claim 11, wherein the threshold is determined based on a print speed of a printer to which the image is transferred and a bandwidth of a communication interface that transfers the image.

14. The non-transitory computer-readable medium of claim 11, wherein compressing the image further comprises compressing the image comprises compressing a lower resolution image and a delta image derived from the image, and wherein reducing the resolution of each compressed block comprises removing a delta image corresponding to the compressed block.

15. The non-transitory computer-readable medium of claim 13, wherein the data size of a compressed block in the compressed image is the sum of: a data size of a portion of the compressed lower resolution image corresponding to the compressed block; and a data size of a portion of the compressed delta image corresponding to the compressed block.

16. The non-transitory computer-readable medium of claim 13, wherein the resolution of the lower resolution image is lowered along one dimension, and wherein the lower resolution image and the delta image are computed based on pixel values of the image, the original resolution of the image, and a desired resolution of the lower resolution image.

17. The non-transitory computer-readable medium of claim 11, wherein growing the non-transition region based on the at least one compressed block comprises including into the non-transition region a block adjacent to one edge of the region, if the block is not a safe-transition block, and wherein the safe-transition block has a resolution lower than an original resolution of the image.

18. A system for switching a resolution of an image, wherein the image comprises at least one block, the system comprises:
a rasterizer configured to derive a lower resolution image and a delta image from the image;
a compressor configured to compress both of the lower resolution image and the delta image;
a data size inspector configured to tag at least one compressed block if the sum of a data size of a portion of the compressed lower resolution image corresponding to the compressed block and a data size of a portion of the compressed delta image corresponding to the compressed block exceeds a threshold; and
a formatter configured to:
grow a non-transition region based on the at least one compressed block that is tagged until a safe-transition block is reached, wherein the non-transition region includes the at least one compressed block in the compressed image; and
reduce the resolution of each compressed block in the non-transition region.

19. The system of claim 18, wherein compressing the image further comprises compressing the image comprises compressing a lower resolution image and a delta image derived from the image, and wherein reducing the resolution of each compressed block comprises removing a delta image corresponding to the compressed block.

20. The system of claim 17, wherein growing the non-transition region based on the at least one compressed block comprises including into the non-transition region a block adjacent to one edge of the region, if the block is not a safe-transition block, and wherein the safe-transition block has a resolution lower than an original resolution of the image.

* * * * *